United States Patent
Awasthi et al.

(10) Patent No.: US 10,962,137 B2
(45) Date of Patent: Mar. 30, 2021

(54) UNIVERSAL ADAPTER ASSEMBLY FOR VALVE ACTUATOR

(71) Applicant: Johnson Controls Technology Company, Auburn Hills, MI (US)

(72) Inventors: Mayank Awasthi, Pune (IN); Kapil Das Sahu, Pune (IN); Akash Rajesh Agrawal, Mumbai (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 32 days.

(21) Appl. No.: 16/036,640

(22) Filed: Jul. 16, 2018

(65) Prior Publication Data

US 2019/0024819 A1    Jan. 24, 2019

Related U.S. Application Data

(60) Provisional application No. 62/533,919, filed on Jul. 18, 2017.

(51) Int. Cl.
*F16K 31/44* (2006.01)
*F16K 5/06* (2006.01)
(Continued)

(52) U.S. Cl.
CPC ............... *F16K 31/44* (2013.01); *F16D 1/00* (2013.01); *F16K 5/0647* (2013.01);
(Continued)

(58) Field of Classification Search
CPC ...... F16K 5/0647; F16K 27/067; F16K 31/44; F16K 31/041; F16K 31/055;
(Continued)

(56) References Cited

U.S. PATENT DOCUMENTS 7,798,170 B2 * 9/2010 Hotz ................. F16K 5/0647
137/556.3
8,733,735 B2 * 5/2014 Strebe .................. F16K 31/043
251/291

(Continued)

*Primary Examiner* — Matthew W Jellett
(74) *Attorney, Agent, or Firm* — Foley & Lardner LLP

(57) ABSTRACT

A universal adapter assembly for coupling a valve actuator to a plurality of different valves having different actuator engagement configurations includes a plurality of interchangeable connectors, a drive shaft, and an adapter bracket. Each of the plurality of interchangeable connectors corresponds to one of the different actuator engagement configurations. Each of the plurality of interchangeable connectors has a proximal end and a distal end. The distal end is configured to engage a valve control knob of a valve having the corresponding actuator engagement configuration. The drive shaft is configured to engage the proximal end of each of the plurality of interchangeable connectors. The adapter bracket is configured to be coupled to the valve. The adapter bracket is further configured to include an opening to receive the drive shaft. The adapter bracket is further configured to include a set of apertures corresponding to the actuator engagement configuration. The adapter bracket is further configured to secure the adapter bracket to a mounting pad of the valve.

20 Claims, 14 Drawing Sheets

(51) Int. Cl.
*F16K 27/06* (2006.01)
*F16D 1/00* (2006.01)
*F16K 37/00* (2006.01)
*F16K 31/04* (2006.01)
*F16K 31/05* (2006.01)

(52) U.S. Cl.
CPC .......... *F16K 27/067* (2013.01); *F16K 31/041* (2013.01); *F16K 31/055* (2013.01); *F16K 37/0008* (2013.01); *Y10T 137/8275* (2015.04); *Y10T 137/8292* (2015.04); *Y10T 137/8309* (2015.04)

(58) Field of Classification Search
CPC .......... F16K 37/0008; F16D 1/00; F16D 1/02; Y10T 137/8275; Y10T 137/8292; Y10T 137/8309
USPC .................................. 251/291, 292
See application file for complete search history.

(56) References Cited

U.S. PATENT DOCUMENTS

| | | | |
|---|---|---|---|
| 8,789,807 B2* | 7/2014 | Kreuter | F16K 31/041 251/291 |
| 9,964,226 B2* | 5/2018 | Scaramucci | F16K 5/0647 |
| 2015/0226343 A1* | 8/2015 | Jenks | F17D 3/00 137/1 |

* cited by examiner

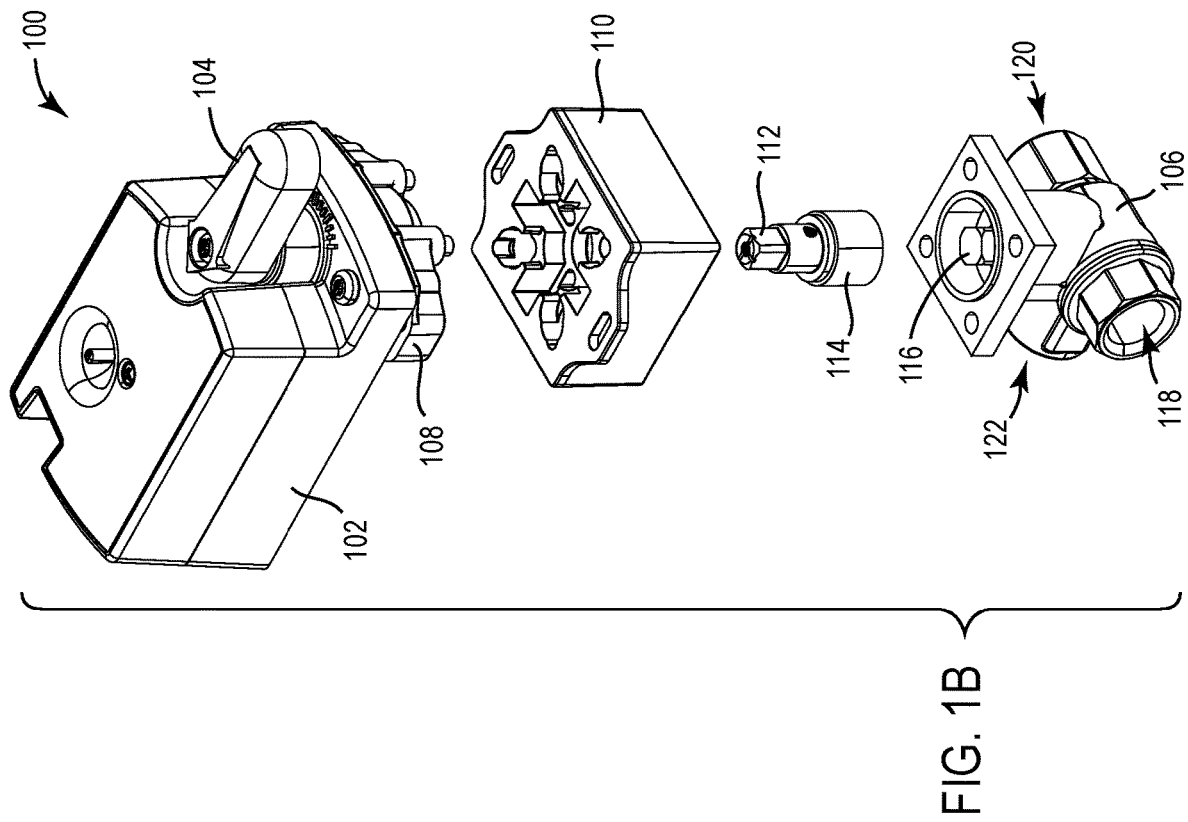
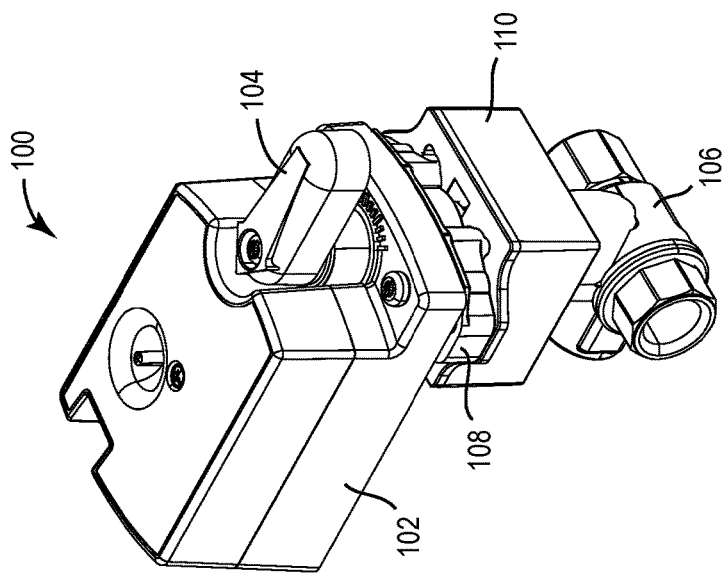

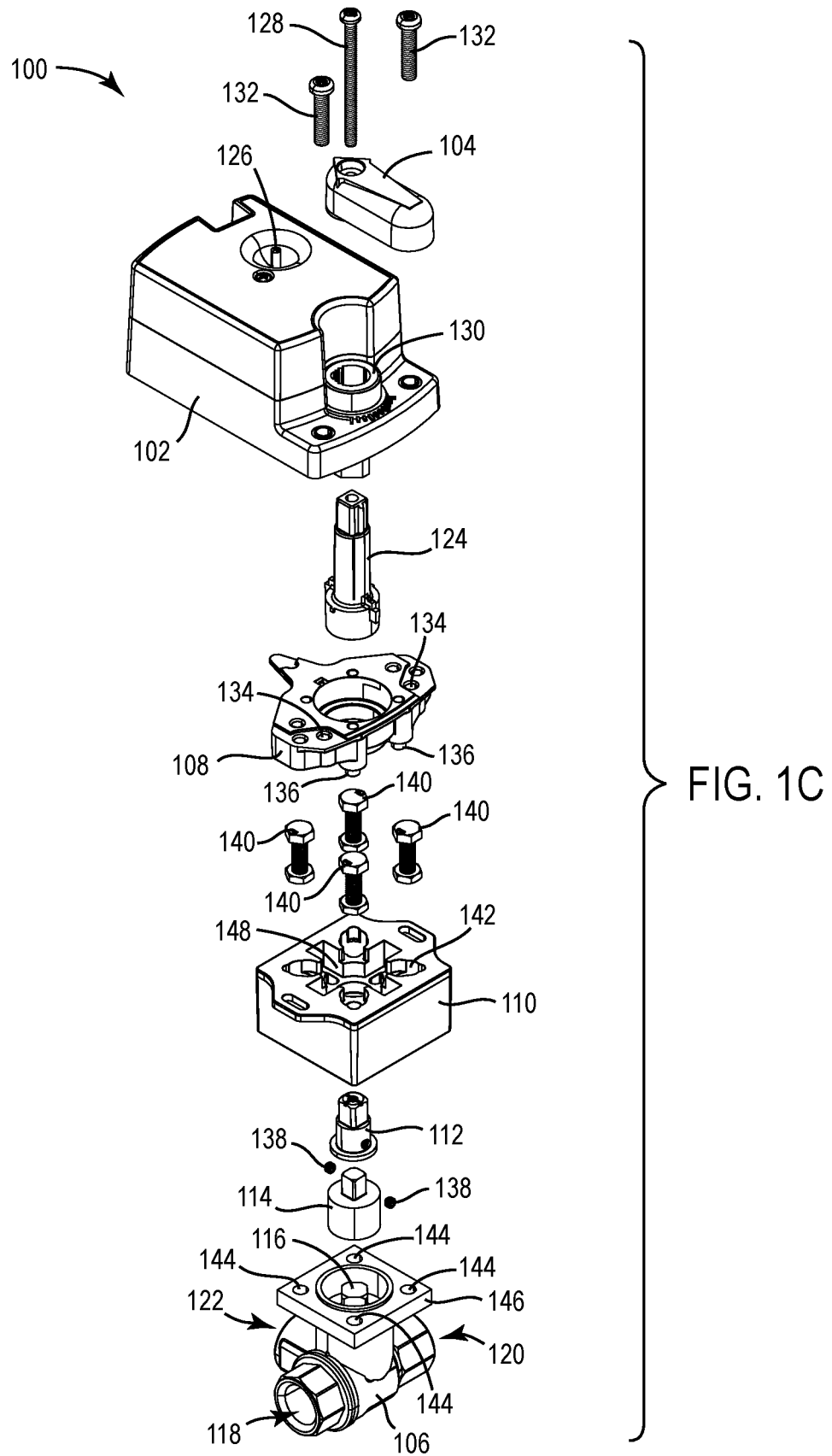

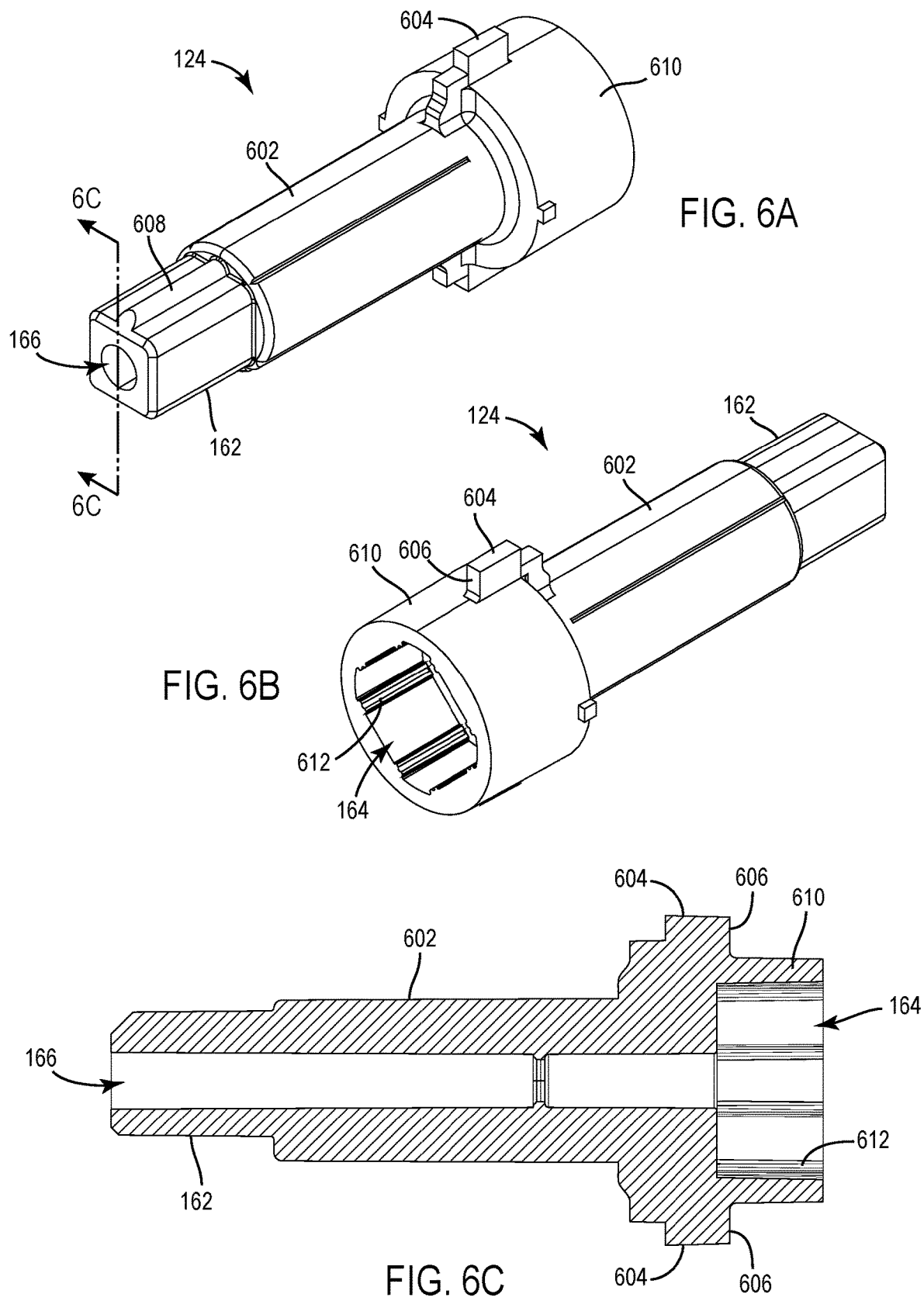

UNIVERSAL ADAPTER ASSEMBLY FOR VALVE ACTUATOR

CROSS-REFERENCE TO RELATED PATENT APPLICATION

This application claims the benefit of and priority to U.S. Provisional Patent Application No. 62/533,919 filed Jul. 18, 2017, the entire disclosure of which is incorporated by reference herein.

BACKGROUND

The present disclosure relates generally to control valves for regulating fluid flow in a building. The present disclosure relates more particularly to a universal adapter for mounting an actuator to a fluid control valve.

A valve can regulate the flow of a fluid (i.e. a liquid or a gas) by opening and closing a barrier within the valve that impedes the flow of the fluid through the valve. The barrier may be controllably adjusted or activated by a valve actuator that is coupled to the valve. Many actuators are designed to interface with a particular valve model. Accordingly, some actuators can be incompatible with particular valve models.

SUMMARY

One implementation of the present disclosure is a universal adapter assembly for coupling a valve actuator to a plurality of different valves having different actuator engagement configurations. The universal adapter assembly includes a plurality of interchangeable connectors, a drive shaft, and an adapter bracket. Each of the plurality of interchangeable connectors corresponds to one of the different actuator engagement configurations. Each of the plurality of interchangeable connectors has a proximal end and a distal end. The distal end is configured to engage a valve control knob of a valve having the corresponding actuator engagement configuration. The drive shaft is configured to engage the proximal end of each of the plurality of interchangeable connectors. The adapter bracket is configured to be coupled to the valve. The adapter bracket is further configured to include an opening to receive the drive shaft. The adapter bracket is further configured to include a set of apertures corresponding to the actuator engagement configuration. The adapter bracket is further configured to secure the adapter bracket to a mounting pad of the valve.

Another implementation of the present disclosure is a universal adapter assembly for coupling a valve actuator to a plurality of different valves having different actuator engagement configurations. The universal adapter assembly includes an interchangeable connector selected from a plurality of interchangeable connectors, a drive shaft, and an adapter bracket. Each of the plurality of interchangeable connectors corresponds to one of the different actuator engagement configurations. Each of the plurality of interchangeable connectors has a proximal end and a distal end. The distal end is configured to engage a valve control knob of a valve having the corresponding actuator engagement configuration. The drive shaft is configured to engage the proximal end of each of the plurality of interchangeable connectors. The adapter bracket is configured to be coupled to the valve. The adapter bracket is further configured to include an opening to receive the drive shaft. The adapter bracket is further configured to include a set of apertures corresponding to the actuator engagement configuration. The adapter bracket is further configured to secure the adapter bracket to a mounting pad of the valve.

Another implementation of the present disclosure is a universal adapter assembly for coupling a valve actuator to a plurality of different valves having different actuator engagement configurations. The universal adapter assembly includes an interchangeable connector, a drive shaft, and an adapter bracket. The interchangeable connector has a proximal end and a distal end. The distal end is configured to engage a valve control knob of a valve having a first actuator engagement configuration. The drive shaft is configured to engage the proximal end of the interchangeable connector. The adapter bracket is configured to be coupled to the valve. The adapter bracket is further configured to include an opening to receive the drive shaft. The adapter bracket is further configured to include a first set of apertures for securing the adapter bracket to a mounting pad of the valve having the first actuator engagement configuration. The adapter bracket is further configured to include a second set of apertures for securing the adapter bracket to a mounting pad of a valve having a second actuator engagement configuration.

Another implementation of the present disclosure is a valve actuator assembly for controlling a valve of a group of valves. The valve actuator assembly includes an interchangeable connector selected from a plurality of interchangeable connectors, a drive shaft, an adapter bracket, and a valve actuator. Each of the plurality of interchangeable connectors has a proximal end and a distal end. The distal end is configured to engage a valve control knob of the valve. The drive shaft is configured to engage the proximal end of each of the plurality of interchangeable connectors. The adapter bracket is configured to be coupled to the valve. The adapter bracket is further configured to include an opening to receive the drive shaft. The adapter bracket is further configured to include a set of apertures for securing the adapter bracket to the valve. The valve actuator includes a driver. The driver is configured to engage the drive shaft.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements, in which:

FIG. 1A is a perspective view of a valve assembly, according to some embodiments.

FIGS. 1B-1C are exploded perspective views of the valve assembly of FIG. 1A, according to some embodiments.

FIGS. 6A-6C are detailed views of a valve driver, according to some embodiments.

DETAILED DESCRIPTION

Overview

Figure 1D:
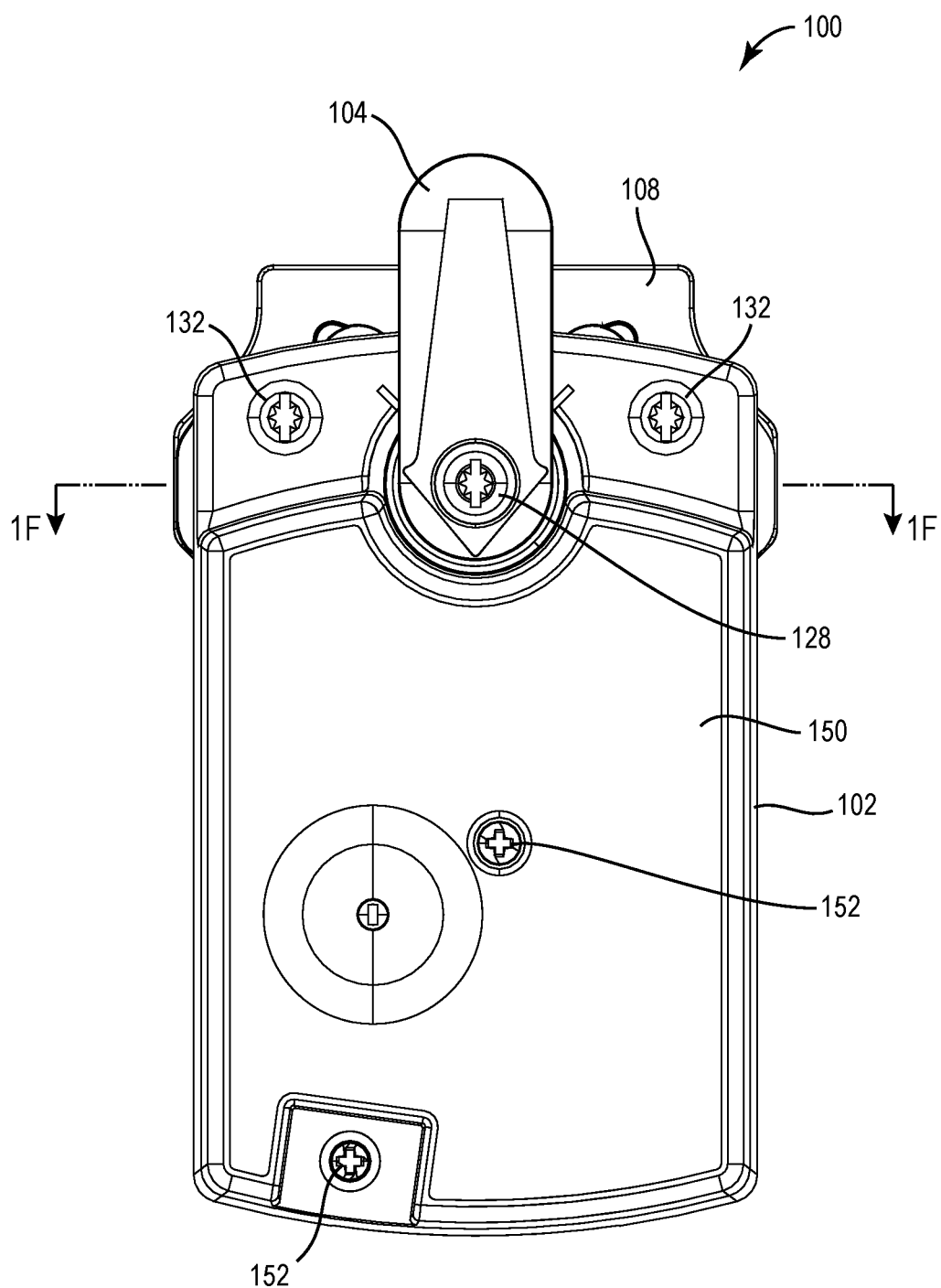
FIG. 1D is a top plan view of the valve assembly of FIG. 1A, according to some embodiments.

Referring generally to the FIGURES, a universal adapter assembly for a valve actuator and components thereof are shown, according to various embodiments. The universal adapter assembly may include a mounting bracket, a drive shaft, and an interchangeable valve connector. The universal adapter assembly couples a valve actuator to one of several possible valve configurations, forming a complete valve assembly. The universal adapter assembly may include an interchangeable connector, which may be selected from a set of interchangeable connectors that enables the valve actuator to be coupled to and used to control a particular valve configuration.

The valve used with the universal adapter assembly regulates the flow of a fluid through the valve by selectively providing a barrier that impedes the flow of the liquid or gas. The valve may be any number of different types of valves (e.g. a ball valve, a globe valve, etc.) configured to regulate the flow of fluid. In some embodiments, the valve has two binary operating positions, i.e. the valve is either open or closed. In other embodiments, the valve may have any number of intermediate operating positions that correspond to being partially open or closed.

The valve actuator uses the universal adapter assembly to control the position of a control knob on the valve. In one position of the control knob, a fluid is able to flow through the valve. As the actuator rotates the control knob, the flow of the fluid is partially or fully impeded, thereby reducing or stopping the flow. In some embodiments, the valve actuator controls the valve using mechanical means (e.g. a motor, gears, a driver, etc.). In other embodiments, the valve actuator may also operate the valve in response to control signals received by the valve actuator. For example, the valve actuator may operate the valve in response to signals received from a field controller or other computing device. The signals may be communicated through any number of types of communications (e.g. a wired connection, a wireless connection, etc.).

Generally, for a valve actuator to control a valve, the actuator must properly interface with the valve. More particularly, the actuator can only control the valve if the actuator can properly engage the control knob of the valve. Accordingly, installing or replacing an actuator in a valve assembly can pose unique challenges. For example, if an actuator needs replacement, one must find a compatible actuator. If a suitable actuator is unavailable, both the actuator and the valve may need replacement.

Embodiments of the present disclosure provide a universal adapter assembly that can be adapted to operate a plurality of different valves having different actuator engagement configurations. Each actuator engagement configuration can correspond to a valve control knob and/or a valve mounting pad of a valve.

In some embodiments, the universal adapter assembly includes an adapter bracket that can be secured to two or more actuator engagement configurations having different valve mounting pads. In this regard, the universal adapter assembly can be secured to two or more valves having different actuator engagement configurations.

In some embodiments, the universal adapter assembly includes an interchangeable connector that engages a control knob of a valve. The interchangeable connector can be selected from a set of interchangeable connectors, whereby each connector in the set is configured to engage a control knob corresponding to a particular actuator engagement configuration. Thus, each control knob can be configured to correspond to a particular actuator engagement configuration. In some embodiments, a proximal end of each connector in the set can be uniform, allowing a drive shaft to control each interchangeable connector in the set by engaging the proximal end. A distal end of each connector in the set can be configured to correspond to a particular actuator engagement configuration. For example, the distal end may include an aperture with a size and shape configured to engage a particular control knob configuration of the valve. In this regard, an actuator can be adapted to control different actuator engagement configurations by selecting a compatible interchangeable connector from the set.

Universal Adapter Assembly for Valve Actuator

Referring now to FIGS. 1A and 1B, a perspective view of valve assembly 100 and an exploded perspective view of valve assembly 100 are respectively shown, according to some embodiments. Valve assembly 100 is shown to include valve 106. Valve 106 regulates the flow of a liquid or gas through it by selectively providing a barrier that impedes the flow of the liquid or gas. Valve actuator 102 controls the flow of the liquid or gas through valve 106 by operating valve control knob 116 of valve 106.

Valve control knob 116 is attached to valve 106 such that rotation of valve control knob 116 about its principal axis regulates the opening and closing of valve 106. For example, if valve 106 is a ball valve, valve control knob 116 may be coupled to a ball internal to valve 106 having a port hole extending through the ball. As valve control knob 116 is rotated about its principal axis, the ball is also rotated. When valve 106 is fully open, it allows the flow of a liquid or gas through valve openings 118, 120, and/or 122. When valve 106 is fully closed, it prevents the flow of a liquid or gas through valve openings 118, 120, and/or 122.

Valve actuator 102 may include pointer 104, which provides visual indicia (e.g. an arrow, a line, etc.) of the position of valve control knob 116. Pointer 104 may be operably coupled to driver 124, drive shaft 112, and valve control knob 116 such that pointer 104 rotates with valve control knob 116. In some embodiments, valve actuator 102 may also operate valve 106 in response to control signals received by valve actuator 102. For example, valve actuator 102 may operate valve 106 in response to signals received from a field controller or other computing device. The signals may be communicated through any number of types of communications (e.g. a wired connection, a wireless connection, etc.).

Valve assembly 100 is shown to include actuator bracket 108. Actuator bracket 108 couples valve actuator 102 to adapter bracket 110. Actuator bracket 108 may be configured to couple with one or more different types of valve actuators, mounting brackets, and valves. For example, actuator bracket 108 may be configured to be coupled with valve actuator 102 or a different type of valve actuator. In some embodiments, actuator bracket 108 is also configured to couple valve actuator 102 to valve 106, allowing adapter bracket 110 to be selectively used.

Valve assembly 100 is shown to include adapter bracket 110, drive shaft 112, and interchangeable connector 114. In some embodiments, adapter bracket 110, drive shaft 112, and interchangeable connector 114 collectively represent a universal adapter assembly allowing actuator 102 to operate a variety of valve 106 configurations. Adapter bracket 110 is generally configured to couple actuator bracket 108 to mounting pad 146 of valve 106. Adapter bracket 110 may include an opening that engages drive shaft 112. Drive shaft 112 may include an aperture that engages a proximal end of interchangeable connector 114. A distal end of interchangeable connector 114 may include an aperture configured to engage valve control knob 116. In this regard, rotation of pointer 104 causes drive shaft 112 and interchangeable connector 114 to rotate, thereby causing valve control knob 116 to rotate about its principal axis.

Referring now to FIG. 1C, another exploded perspective view of valve assembly 100 is shown, according to some embodiments. Valve actuator 102 and actuator bracket 108 can be configured to receive one or more fasteners 132 to couple actuator bracket 108 to valve actuator 102. For example, fasteners 132 may be threaded bolts that provide a compressive force to valve actuator 102 and actuator bracket 108 when engaged with threaded apertures of actuator bracket 108. In other embodiments, actuator bracket 108 may be secured to valve actuator 102 in any number of ways (e.g. adhesive, welding, nuts, etc.).

Actuator bracket 108, pointer 104, driver 124, and drive shaft 112 can be coupled by stem fastener 128. For example, stem fastener 128 may be a threaded bolt that provides a compressive force to secure actuator bracket 108, pointer 104, driver 124, and drive shaft 112 to actuator 102 when engaged with threaded aperture of drive shaft 112. Valve actuator 102 can be configured to selectively rotate driver 124 about the axis formed by stem fastener 128. For example, pointer 104 can contain an aperture configured to engage an upper end of driver 124. A lower end of driver 124 contains an aperture configured to engage an upper end of drive shaft 112. In this regard, rotation of driver 124 causes drive shaft 112 to rotate and, in turn, valve control knob 116 to also rotate, thereby controlling the flow of the liquid or gas through valve 106. Pointer 104 also rotates with driver 124 and provides a visual indication of the position of valve control knob 116. In various embodiments, pointer 104, driver 124, and drive shaft 112 can be coupled in any number of ways (e.g. adhesive, welding, nuts, etc.).

Actuator bracket 108 is shown to have mounting posts 136. Mounting posts 136 can be configured to engage one or more apertures 142 of adapter bracket 110 and provide added stability to valve actuator 102. In some embodiments, mounting posts 136 are also configured to engage apertures 144 of valve mounting pad 146, allowing adapter bracket 110, drive shaft 112, and interchangeable connector 114 to be optionally used in valve assembly 100.

One or more fasteners 140 may be provided to secure adapter bracket 110 to mounting pad 146 of valve 106. For example, fasteners 140 may be threaded bolts that are inserted through adapter bracket 110 and apertures 144 of mounting pad 146. Engaging fasteners 140 to one or more nuts creates a compressive force that secures adapter bracket 110 to valve 106. In other embodiments, adapter bracket 110 may be secured to valve 106 by any number of securing means (e.g. adhesive, welding, etc.). Adapter bracket 110 may also house drive shaft 112 and interchangeable connector 114 when adapter bracket 110 is secured to valve 106. Drive shaft 112 and interchangeable connector 114 can be provided within aperture 148 of adapter bracket 110. Rotation of drive shaft 112 within aperture 148 of adapter bracket 110 also causes valve control knob 116 to rotate, thereby operating valve 106.

In some embodiments, actuator 102 is provided with drive device 130. Drive device 130 can be a drive mechanism, a hub, or other device configured to drive or effectuate rotational movement of driver 124. For example, drive device 130 may include an aperture configured to engage a portion of driver 124. Drive device 130 can control the rotation of driver 124 by providing force to walls of driver 124 along its principal axis, causing driver 124 to experience a rotational force. In some embodiments, actuator 102 may include a mechanical system to control drive device 130. For example, the mechanical system can include a motor that drives the drive device 130 in response to received control signals.

Referring now to FIG. 1D, valve actuator 102 may include a generally flat surface 150 provided on an upper housing of actuator 102. In some embodiments, the upper housing of actuator 102 houses components for facilitating operation of the drive device 130, such as a motor, wiring, interfaces, etc. Fasteners 152 may be threaded fasteners received by a set of apertures provided on surface 150. Fasteners 152 contact surface 150 and provide compressive force securing the upper housing to actuator 102 when threaded into the upper housing to actuator 102.

Figure 1E:
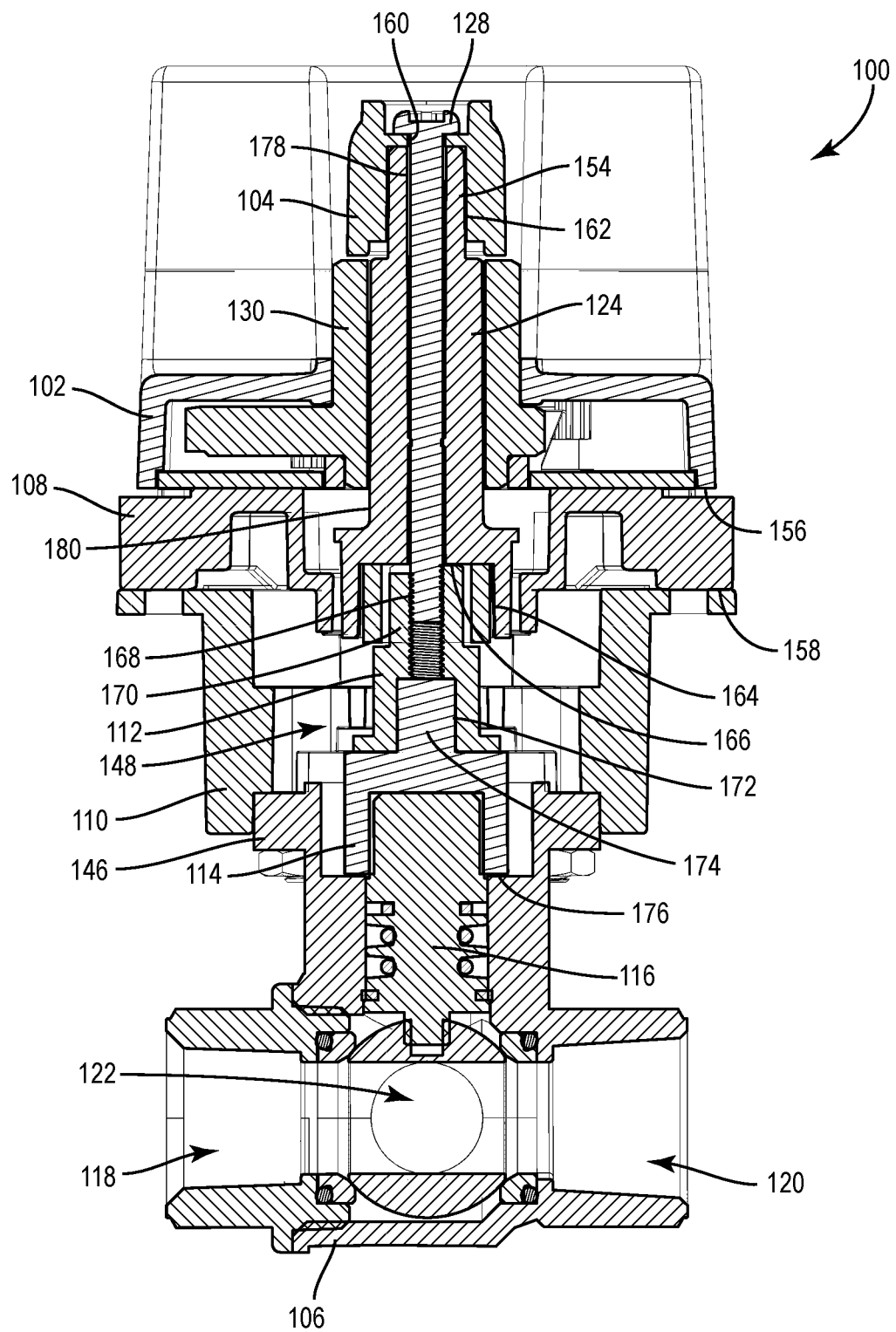
FIG. 1E is a sectional view of the valve assembly of FIG. 1A, according to some embodiments.

Referring now to FIG. 1E, pointer 104 is shown to have opening 160 configured to receive stem fastener 128 in a direction perpendicular to surface 150. Stem fastener 128 extends through opening 178 of driver 124 and may be configured to engage aperture 168 of drive shaft 112. Stem fastener 128 may be threadably coupled to aperture 168 of drive shaft 112, shown in greater detail in FIGS. 3A-3C. In another embodiment, stem fastener 128 is secured to drive shaft 112 in any number of ways (e.g. by engaging threaded nuts, weld beads, etc.).

In some embodiments, stem fastener 128 is configured to supply compressive force to pointer 104 when stem fastener 128 engages aperture 168. This force secures pointer 104 to actuator 102. Engaging stem fastener 128 to aperture 168 of drive shaft 112 also provides compressive force to adapter bracket 110, thereby securing adapter bracket 110 to surface 158 of actuator bracket 108. This also provides compressive force securing actuator bracket 108 to surface 156 of actuator 102, shown in greater detail in FIGS. 2A-2B.

Pointer 104 is shown to have aperture 154 configured to engage stem portion 162 of driver 124. In this regard, aperture 154 has a diameter greater than diameter of stem portion 162 of driver 124. In some embodiments, aperture 154 may have a rectangular shape corresponding to a rectangular shape of stem portion 162 of pointer 104, thereby allowing pointer 104 to rotate driver 124 along its primary axis.

Driver 124 is shown to include stem portion 162 configured to extend through drive device 130 of valve actuator 102. Stem portion 162 engages with aperture 154 of pointer 104 allowing driver 124 to rotate along its primary axis within drive device 130. Driver 124 may also include drive portion 166 that extends through opening 180 of actuator bracket 108. Drive portion 166 of driver 124 may include one or more flanges extending perpendicular to the primary axis of driver 124. In this regard, drive portion 166 of driver 124 can be configured such that driver 124 can travel through opening 180 of actuator bracket 108 until flanges of drive portion 166 engage an inner surface of actuator bracket 108.

Drive portion 166 of driver 124 may include an aperture 164 extending in the same direction as opening 178. Aperture 164 can be configured to engage driver portion 170 of drive shaft 112. Aperture 164 has a diameter greater than diameter of driver portion 170 of drive shaft 112. Aperture 164 may have a rectangular shape corresponding to a rectangular shape of driver portion 170. In this regard, rotation of driver 124 along its principal axis causes rotation of drive shaft 112 along the same axis.

Drive shaft 112 may include driver portion 170 configured to engage aperture 164 of driver 124, as described above. Driver portion 170 of shaft 112 is shown to include aperture 168 configured to receive stem fastener 128 and secure stem fastener 128 to shaft 112. For example, stem fastener 128 may be threadably coupled to aperture 168 to secure stem fastener 128 to shaft 112. Drive shaft 112 may include an aperture 172 that is configured to engage interchangeable connector 114 such that rotation of drive shaft 112 also causes interchangeable connector 114 to rotate along the same axis.

Interchangeable connector 114 may include drive portion 174 configured to engage aperture 172 of drive shaft 112. For example, interchangeable connector 114 can have an aperture 176 that is configured to engage valve control knob 116 of valve 106. Interchangeable connector 114 is selected from a plurality of interchangeable connectors, whereby each interchangeable connector in the set can be configured to engage a particular valve 106 from a group of valves. In this regard, aperture 176 of the selected interchangeable connector 114 can be configured to engage control knob 116 of valve 106. Actuator 102 and other components described herein (e.g. pointer 104, actuator bracket 108, adapter bracket 110, driver 124, drive shaft 112) can be used with a particular valve 106 from the group of valves by selecting an interchangeable connector 114 configured to engage valve control knob 116.

Figure 2A:
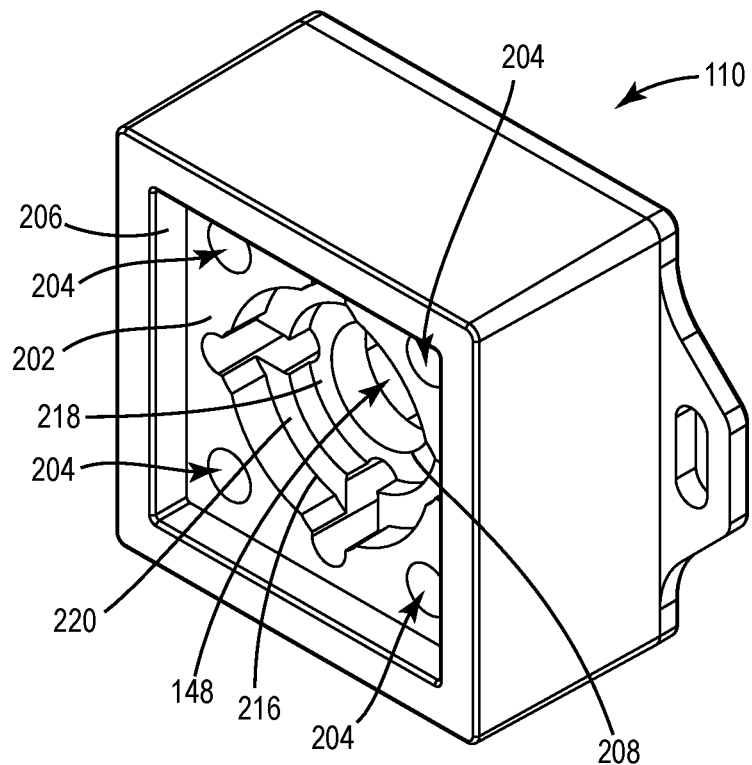
FIGS. 2A-2E are detailed views of an adapter bracket for a valve actuator, according to some embodiments.
Figure 2B:
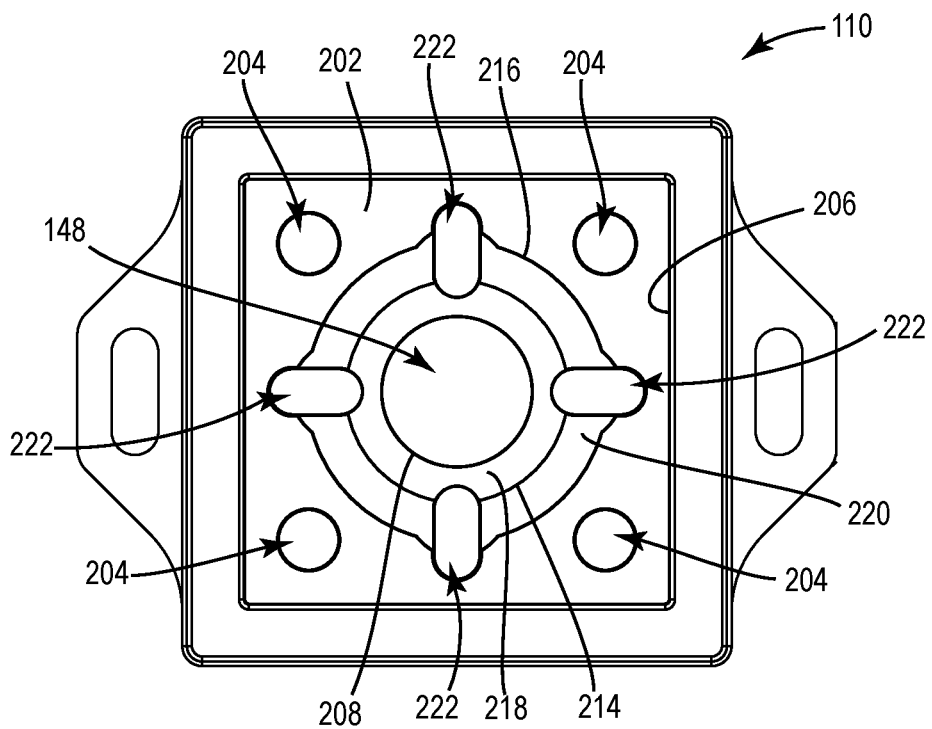

Referring now to FIGS. 2A-2B, a perspective view and end view of adapter bracket 110 are shown, according to some embodiments. Adapter bracket 110 is shown to include surface 202 with aperture 148 configured to receive drive shaft 112. Aperture 148 may include a first opening 208 and second opening 214. First opening 208 is shown to have a smaller diameter than second opening 214, creating surface 218. Surface 218 can be configured to engage a lip of drive shaft 112 (e.g. surface 306 of lip 302). In this regard, engaging stem fastener 128 to aperture 148 of drive shaft 112 imparts a compressive force to surface 218 of adapter bracket 110 toward actuator 102. This force secures drive shaft 112, driver 124, pointer 104, and adapter bracket 110 to actuator 102. Aperture 148 also is shown to include a third opening 216 that has a larger diameter than second opening 214, creating surface 220. In some arrangements, surface 220 and third opening 216 are configured to receive one or more portions of valve 106, for example to provide additional stability.

Adapter bracket 110 is also shown to include a plurality of ridges 206 which extend generally perpendicularly from surface 202 away from the body of adapter bracket 110. Ridges 206 can be configured such that one or more inner surfaces of ridges 206 contact an outer portion of valve mounting pad 146 when adapter bracket 110 is attached to valve mounting pad 146. Although four ridges 206 are shown, it is contemplated that ridges 206 may be one or more ridges, in other embodiments. For example, a single ridge along the perimeter of surface 202 may also be used.

Figure 2C:
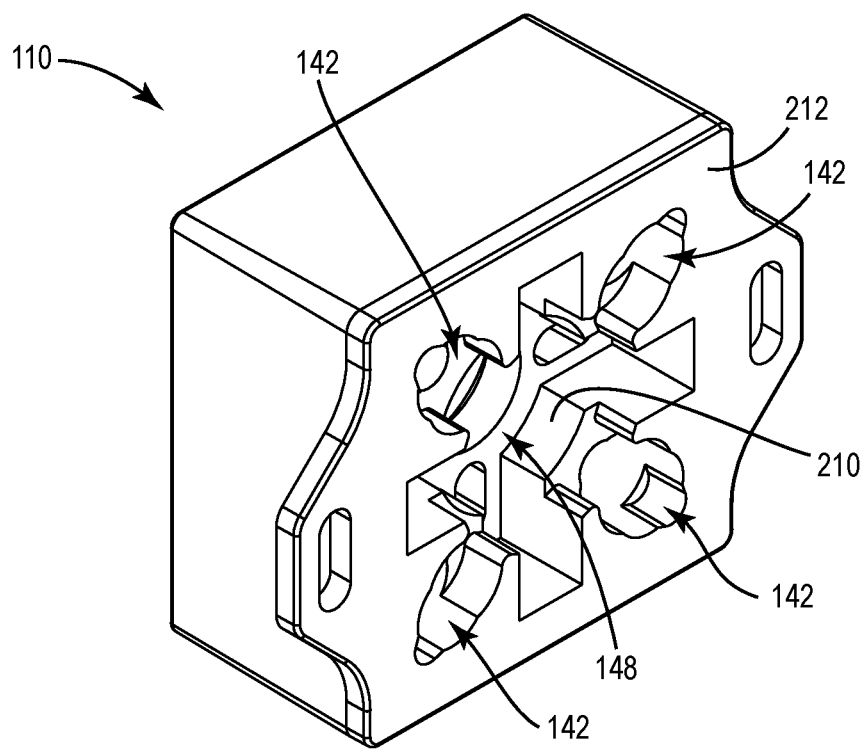
Figure 2D:
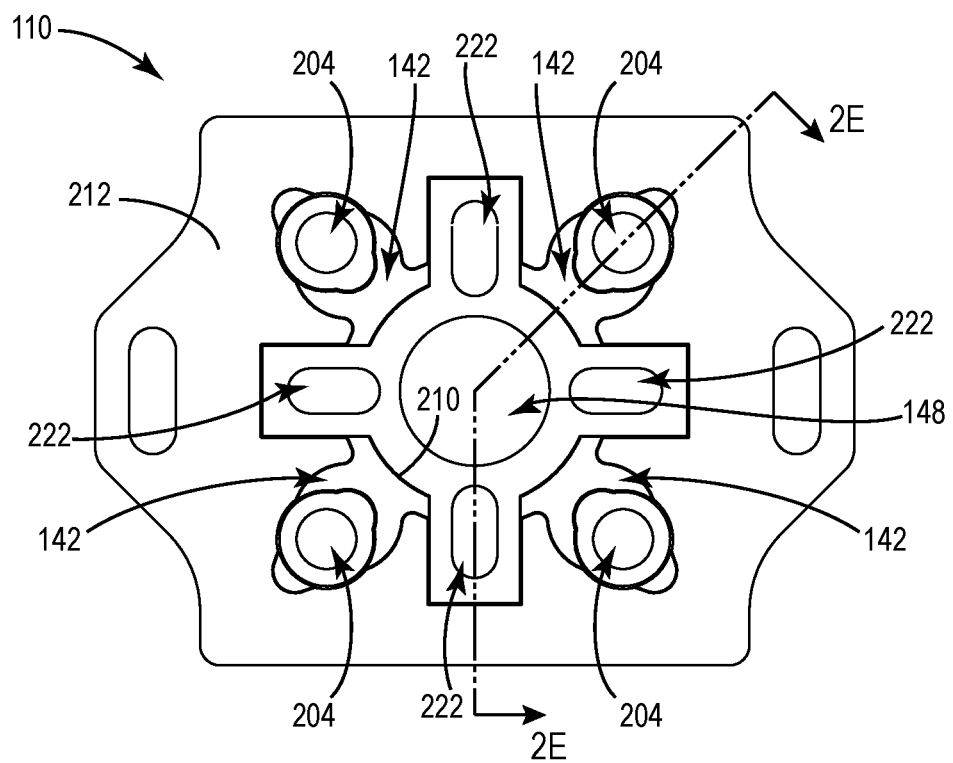
Figure 2E:
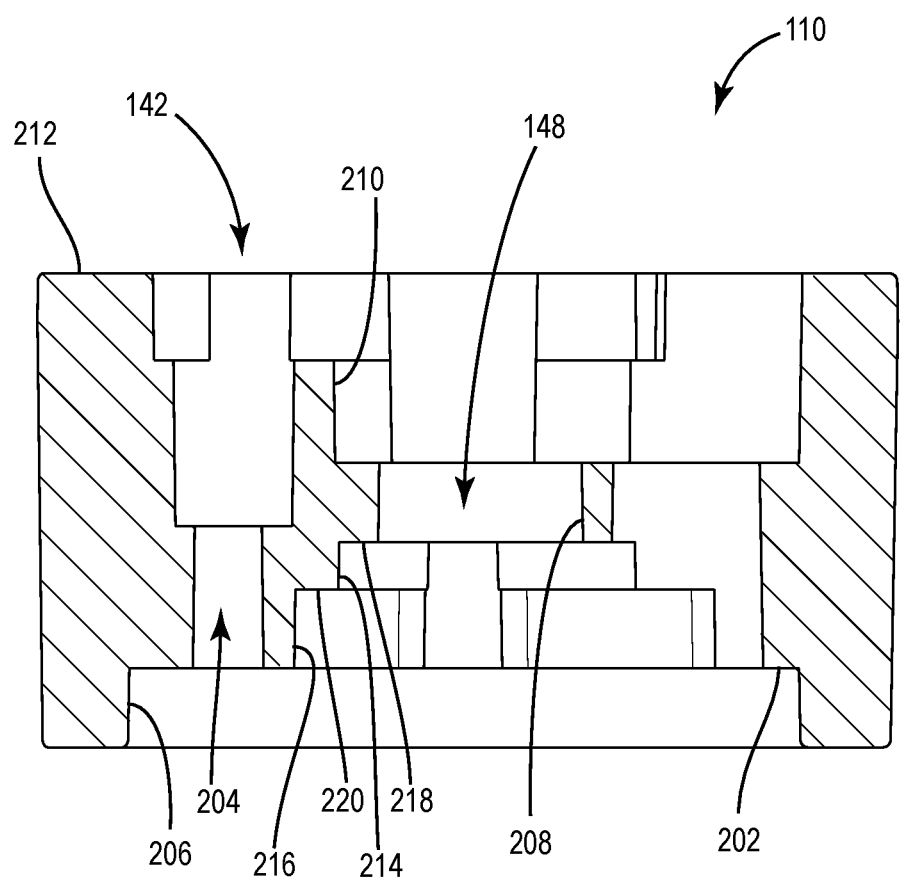

Referring now to FIGS. 2C-2E, various views of adapter bracket 110 are shown, according to some embodiments. Adapter bracket 110 is shown to include surface 212 configured to face surface 158 of actuator bracket 108. Adapter bracket 110 is also shown to have apertures 142 which extend from surface 212 into adapter bracket 110 and are configured to receive mounting posts 136 of actuator bracket 108. Apertures 142 may also include openings 204 which are configured to receive fasteners 140 to secure adapter bracket 110 to valve 106. In some embodiments, apertures 142 may have a non-cylindrical shape. For example, the diameters of openings 204 may be configured to receive fasteners 140 to secure adapter bracket 110 to valve 106. However, the diameters of apertures 142 toward surface 202 may be larger than the diameters of openings 204 to allow apertures 142 to receive both fasteners 140 and mounting posts 136. In other embodiments, apertures 142 are generally cylindrical in shape and have a uniform diameter.

Adapter bracket 110 can be configured to include one or more sets of openings 204. One set of openings 204 can correspond to valve mounting pad 146, allowing adapter bracket 110 to be secured to valve 106. For example, the set of openings 204 can be threaded and have a diameter configured to receive fasteners 140. Adapter bracket 110 can also be configured to include another set of openings 204 corresponding to another mounting pad configuration, allowing adapter bracket 110 to be secured to another valve. Each set of openings 204 can have a different size and/or shape, and/or can be provided at various locations of surface 212. Any number of sets of openings 204 can be provided having various sizes, shapes, and/or locations of surface 212.

Adapter bracket 110 can be configured to include one or more slots 222. In some embodiments, slots 222 are configured to receive one or more fasteners (e.g. fasteners 140) such that adapter bracket 110 can be secured to one or more valve mounting pad configurations of a valve (e.g. valve mounting pad 146 of valve 106). Adapter bracket 110 is shown to include four slots 222 located between apertures 142 and extending in a direction perpendicular to surface 212. Each slot 222 is shown to have an oval shape, allowing each slot 222 to receive a fastener at various distances relative to aperture 148. In this regard, slots 222 can allow adapter bracket 222 to be secured to various mounting pad configurations. Any number of slots 222 can be provided having various sizes, shapes, and/or locations of surface 212. For example, in some embodiments, one or more slots 222 can be configured with a shape and/or size similar to openings 204.

In some embodiments, adapter bracket 110 may include any number of apertures 142 configured to receive mounting posts 136. For example, apertures 142 may be eight apertures that allow adapter bracket 110 to be attached to two or more configurations of valve 106 (e.g. two or more models). For example, four apertures may enable adapter bracket 110 to be secured to a first valve mounting pad 146 configuration of valve 106 and four other apertures may enable adapter bracket 110 to be secured to a second valve mounting pad 146 configuration of valve 106. In some arrangements, adapter bracket 110 may include apertures 142 configured to receive mounting posts 136 and different apertures configured to receive fasteners 140. In another embodiment, fasteners 140 are omitted and adapter bracket 110 can be secured to valve mounting pad 146 by other securing means (e.g. welding, adhesive, hook and loop fasteners, or any other securing means).

In situations where valve 106 regulates the flow of a hot liquid or gas, excess heat from the liquid or gas may have a detrimental effect on the electrical or mechanical components of valve actuator 102. Advantageously, adapter bracket 110 can be configured to provide a spacing between valve 106 and valve actuator 102, allowing heat to dissipate before reaching actuator 102. For example, adapter bracket 110 may have a length dimension providing greater distance between valve mounting pad 146 and actuator 102. Any number of heat resistive materials may be used for adapter bracket 110. For example, adapter bracket 110 may be constructed using resin, glass-reinforced resin, rubber, etc., or any other material that reduces the transfer of thermal energy from valve 106 to valve actuator 102.

Figure 3A:
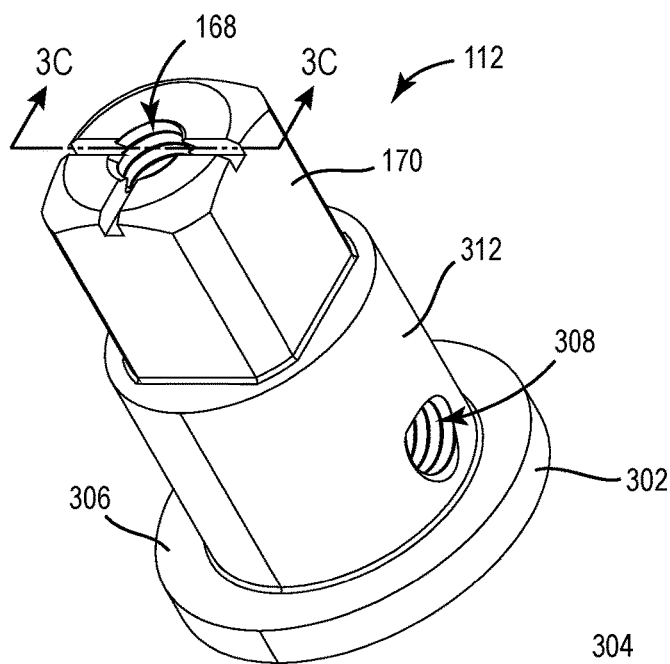
FIGS. 3A-3C are detailed views of a valve drive shaft, according to some embodiments.
Figure 3B:
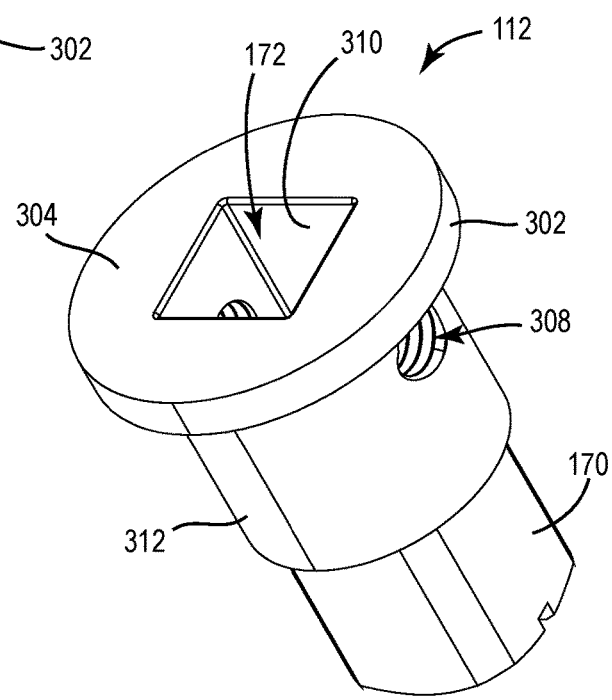
Figure 3C:
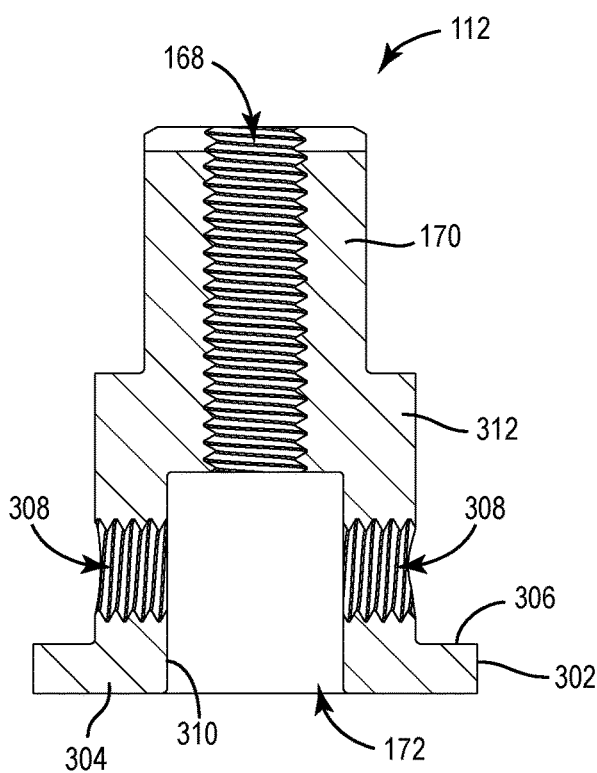

Referring now to FIGS. 3A-3C, drive shaft 112 is shown in greater detail, according to some embodiments. Drive shaft 112 can be generally configured to couple driver 124 to interchangeable connector 114. In some embodiments, drive shaft 112 is generally configured to engage a plurality of interchangeable connectors 114 whereby each interchangeable connector 114 in the set can engage one or more configurations of valve 106 (e.g. valve control knob 116). In some embodiments, drive shaft 112 can be configured to directly engage valve control knob 116. This allows valve actuator 102 to control valve 106 without the use of interchangeable connector 114.

Drive shaft 112 is shown to include driver portion 170 and connector portion 312. Driver portion 170 can be generally configured to be inserted into aperture 164 of driver 124 such that rotation of driver 124 causes rotation of drive shaft 112 along the same axis. Driver 124 controls rotation of drive shaft 112 by providing force to walls of driver portion 170. In some embodiments, driver portion 170 may include one or more recesses or grooves configured to engage inner surfaces of aperture 164.

Driver portion 170 may include aperture 168 that receives stem fastener 128. In some embodiments, aperture 168 is a threaded aperture such that stem fastener 128 is threadably coupled to aperture 168. In other embodiments, aperture 168 is unthreaded and other securing means (e.g. nuts, adhesive, welding, etc.) are used to secure stem fastener 128 to drive shaft 112.

Connector portion 312 of drive shaft 112 is shown to include aperture 172. Aperture 172 can be generally configured to engage drive portion 174 of interchangeable connector 114. In this regard, rotation of drive shaft 112 along its principal axis causes rotation of interchangeable connector 114 along the same axis, as well as rotation of valve control knob 116. In some embodiments, aperture 172 may include one or more grooves or recesses along inner surfaces 310 configured to engage one or more grooves or recesses provided with drive portion 174 of interchangeable connector 114. In some embodiments, aperture 172 is configured to directly engage valve control knob 116. This allows valve actuator 102 to control valve 106 without the use of interchangeable connector 114.

Connector portion 312 and/or aperture 172 can be configured in any geometric orientation. Embodiments of connector portion 312 and/or aperture 172 can correspond to square, double-square, triple-square, rectangular, triangular, pentagon, hexagonal, double-hex, diamond, star, polydrive, etc. For example, aperture 172 may be rectangular-shaped having four inner surfaces 310 corresponding to a rectangular shape of drive portion 174 of interchangeable connector 114.

Connector portion 312 of drive shaft 112 is also shown to include lip 302. Lip 302 is shown to have an outer diameter greater than the adjacent portion of connector portion 312, creating surface 306. In some embodiments, when drive shaft 112 is inserted in aperture 148 of adapter bracket 110, lip 302 (i.e. surface 306) is configured to engage surface 218 of adapter bracket 110, thereby preventing lip 302 of drive shaft 112 from passing through aperture 148. In this regard, by engaging stem fastener 128 to aperture 168 of drive shaft 112, lip 302 applies a compressive force to adapter bracket 110 towards actuator 102. This force secures drive shaft 112 and adapter bracket 110 to actuator 102.

In some embodiments, connector portion 312 may include one or more apertures 308. Apertures 308 can be configured to receive one or more fasteners to facilitate engaging interchangeable connector 114 to drive shaft 112. For example, one or more apertures 308 can be a threaded aperture that receives a threaded fastener extending into aperture 308. In some embodiments, the threaded fastener may secure interchangeable connector 114 to aperture 308 by friction force. In other embodiment, the fastener may extend through aperture 308 and through an opening provided with interchangeable connector 114.

Figure 4A:
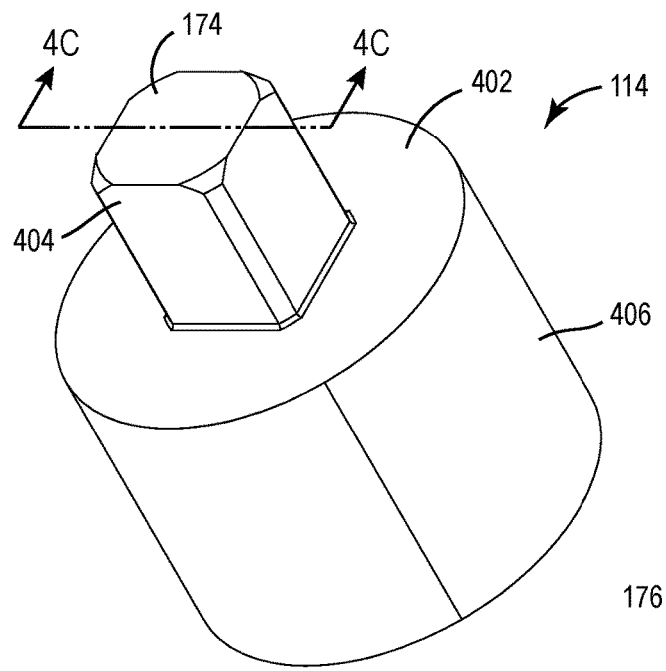
FIGS. 4A-4C are detailed views of a valve connector, according to some embodiments.
Figure 4B:
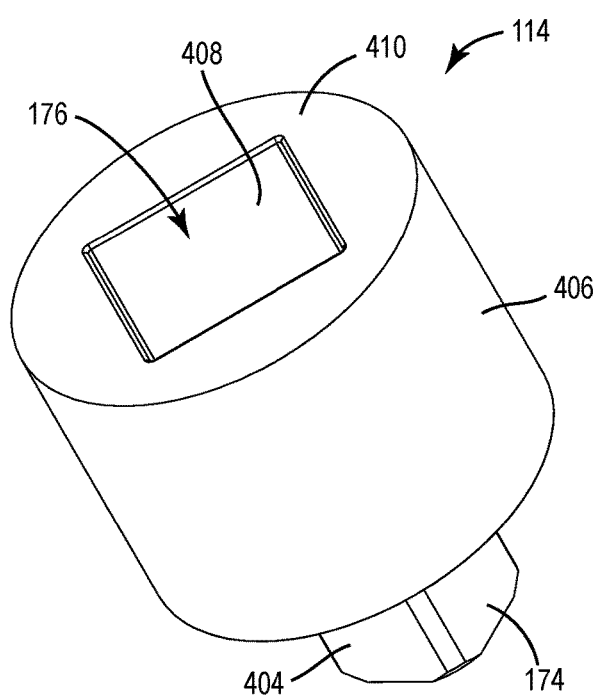
Figure 4C:
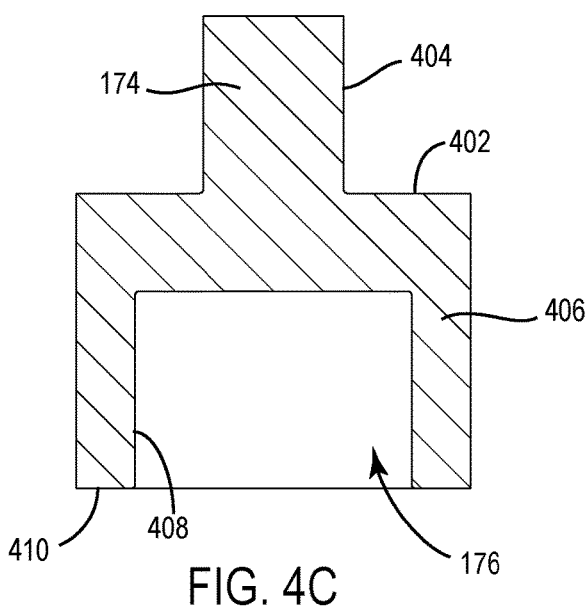
Figure 5A:
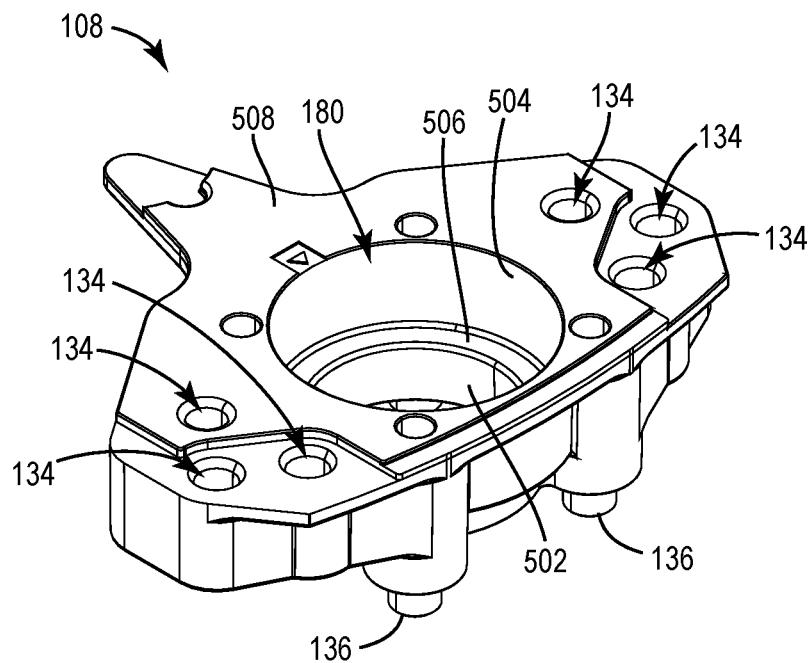
FIGS. 5A-5F are detailed views of an actuator bracket for a valve actuator, according to some embodiments.
Figure 5B:
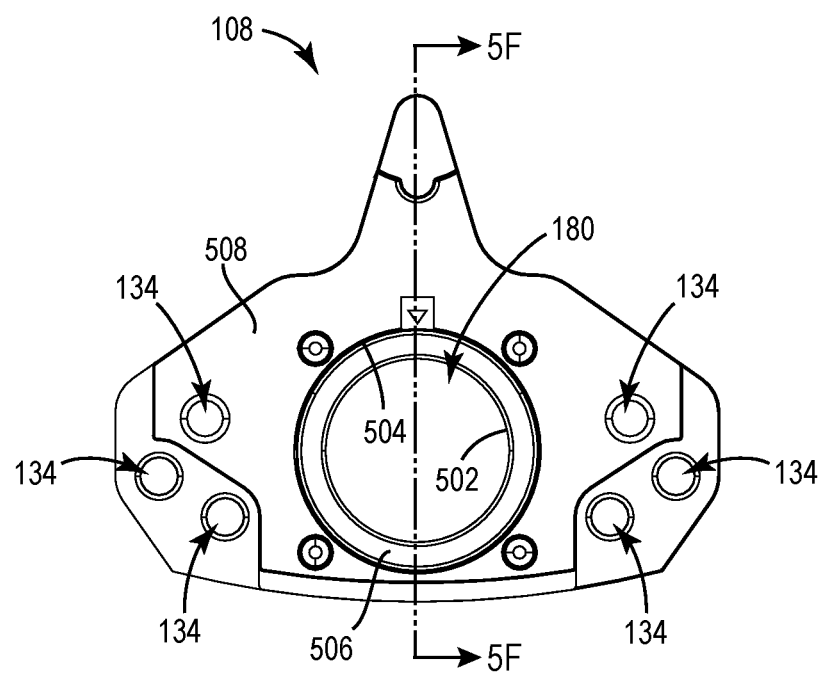
Figure 5C:
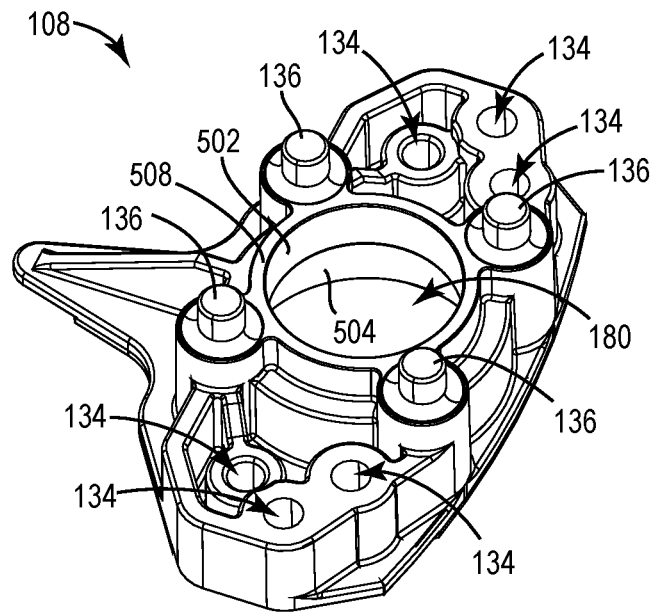
Figure 5D:
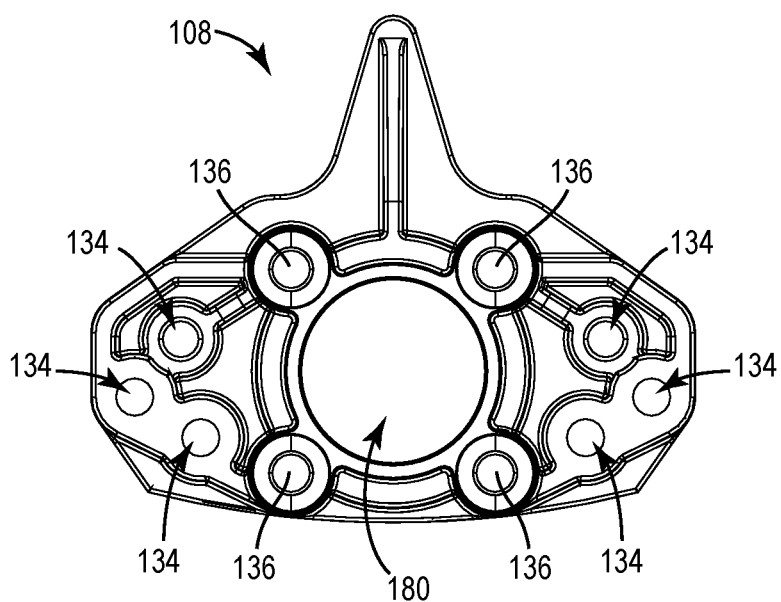
Figure 5E:
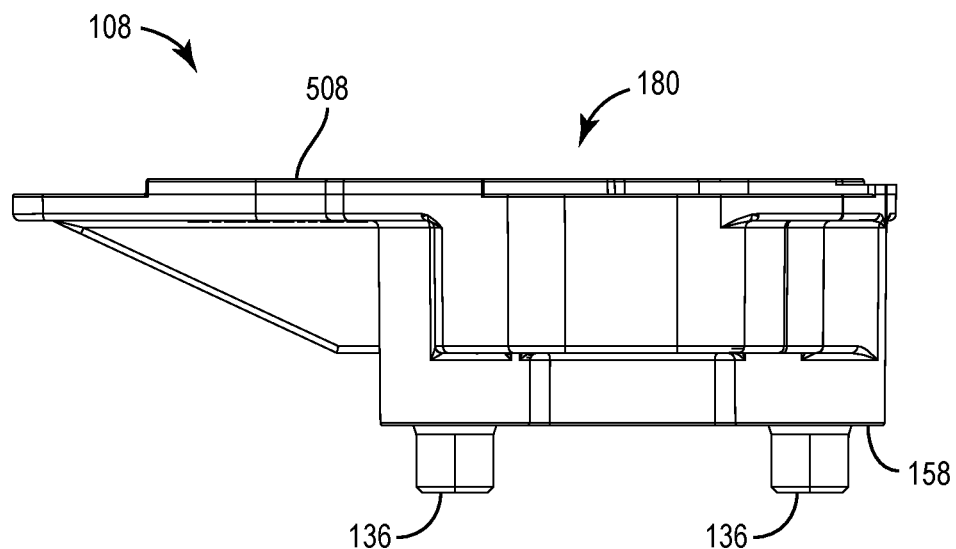
Figure 5F:
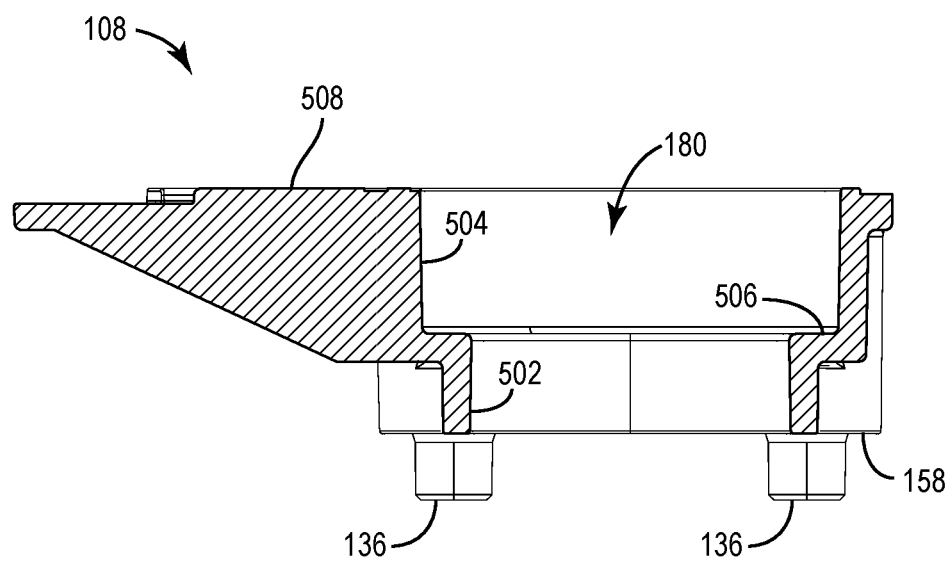

Referring now to FIGS. 4A-4C, interchangeable connector 114 is shown in greater detail, according to some embodiments. The interchangeable connector 114 may be selected from a set of interchangeable connectors, whereby each connector 114 in the set can be configured to control a particular valve configuration. For example, a proximal end of each connector 114 in the set can be uniform, allowing the drive shaft 112 to control each interchangeable connector in the set by engaging the proximal end. A distal end of each connector 114 in the set can be adapted to a particular valve configuration (e.g. the valve control knob 116). In this regard, actuator 102 can be adapted for use with a variety of valve 106 configurations by selecting a compatible interchangeable connector 114 from the set.

Interchangeable connector 114 is shown to include a drive portion 174 towards its proximal end and a control portion 406 towards its distal end. Drive portion 174 can be generally configured to be inserted into aperture 172 of drive shaft 112 such that rotation of drive shaft 112 along its principal axis causes rotation of interchangeable connector 114 along the same axis. Drive shaft 112 causes rotation of interchangeable connector 114 by providing force to surfaces 404 of drive portion 174. In some embodiments, surfaces 404 may include one or more recesses or grooves configured to engage inner surfaces of aperture 172. In some embodiments, the size and shape of drive portion 174 is configured such that surface 402 of interchangeable connector 114 contacts surface 304 of drive shaft 112 when engaged with drive shaft 112.

Control portion 406 can be configured to engage valve control knob 116 and/or mounting pad 146 such that rotation of interchangeable connector 114 causes rotation of valve control knob 116. In some embodiments, control portion 406 includes an aperture 176 having one or more dimensions corresponding to valve control knob 116. Control portion 406 and/or aperture 176 can be configured to correspond to any geometric orientation. Embodiments of control portion 406 and/or aperture 176 can correspond to square, double-square, triple-square, rectangular, triangular, pentagon, hexagonal, double-hex, diamond, star, polydrive, etc. For example, aperture 176 can be square shaped and have four inner surfaces 408 configured to engage four corresponding surfaces of valve control knob 116.

Aperture 176 can include inner surfaces 408 with grooves, recesses, flanges, etc. corresponding to a particular valve control knob 116. In some embodiments, control portion 406 includes a surface 410 that has a set of grooves, recesses, flanges, etc. corresponding to a particular configuration of valve control knob 116. Control portion 406 can include a flange extending away from and perpendicular to surface 410. The flange can be configured to be inserted into an aperture of valve control knob 116 such that the flange engages inside surfaces of the aperture of the valve control knob 116. In this regard, aperture 176 may be optionally provided with control portion 406.

Referring now to FIGS. 4A-4F, actuator bracket 108 is shown in greater detail, according to some embodiments. Driver opening 180 extends through actuator bracket 108 and may include opening 504 having a first diameter and opening 502 having a second diameter. Opening 504 can be configured such that its diameter is larger than that of opening 502, thereby forming inner surface 506. In this regard, inner surface 506 can be configured to engage one or more flanges (e.g. flange 604) of driver 124 extending perpendicular to its principal axis, thereby preventing driver 124 from passing through opening 502.

Actuator bracket 108 is also shown to have a plurality of apertures 134. Apertures 134 can be configured to receive a plurality of fasteners (e.g. fasteners 132) to secure actuator bracket 108 to valve actuator 102. Actuator bracket 108 may include any number of apertures 134 to allow attachment to a variety of valve actuators. For example, one set of apertures may correspond to a particular type of valve actuator, while another set may correspond to a different type of valve actuator. In this way, actuator bracket 108 may be mounted to any number of different types of valve actuators.

In some embodiments, one or more apertures 134 are threaded apertures and fasteners 132 are threadably coupled to apertures 134. For example, fasteners 132 may be a bolt that is threaded into a threaded aperture of apertures 134. In some embodiments, apertures 134 are unthreaded and fasteners 132, etc. engage other securing means (e.g. nuts, adhesive, welding, etc.) to secure actuator bracket 108 to valve actuator 102.

Actuator bracket 108 is further shown to include a plurality of mounting posts 136. Mounting posts 136 are configured to engage apertures 142 of adapter bracket 110. Engagement of mounting posts 136 to apertures 142 provides additional stability for valve actuator 102 as it operates driver 124. In some embodiments, mounting posts 136 may be any number of mounting posts. For example, actuator bracket 108 may have four mounting posts, as shown in FIG. 4C. In another example, actuator bracket 108 may have eight posts.

Mounting posts 136 may also have any number of spatial relationships between mounting posts. For example, mounting posts 136 are shown in FIG. 4C to be approximately equidistant from the center of driver opening 180. Each mounting post is also shown in FIG. 4C to be approximately equidistant to two other mounting posts. However, any number of spatial relationships between mounting posts 136 are also contemplated. For example, mounting posts 136 may be two mounting posts spatially closer to the center of opening 180 than a third post that is farther away from the center of opening 180. In another example, mounting posts 136 may be arranged either symmetrically or asymmetrically.

According to yet other embodiments, mounting posts 136 may also have any number of shapes to engage apertures 142. For example, mounting posts 136 are generally shown to be of a substantially cylindrical shape. However, any number of shapes is also contemplated. For example, mounting posts 136 may generally be rectangular in shape, hexagonal in shape, etc., or be any other shape suitable to engage apertures 142 and provide stability for valve actuator 102.

Any number of materials may be used to construct actuator bracket 108. For example, actuator bracket 108 may be made from polycarbonate resin, glass-reinforced resin, etc. or any other suitable material to couple valve actuator 102 to adapter bracket 110.

Referring now to FIGS. 6A-6C, driver 124 is shown in greater detail, according to some embodiments. Driver 124 may include stem portion 162, middle portion 602 and drive portion 610. Drive portion 610 may include aperture 164 which can be configured to engage drive shaft 112. In some embodiments, aperture 164 may include inner surfaces 612 with one or more grooves configured to provide frictional force to rotate drive shaft 112 when driver 124 is rotating.

Drive portion 610 may include a set of flanges 604 extending away from and perpendicular to drive portion 610. Although FIGS. 6A-6C show two flanges 604, any number can be provided can be provided in various embodiments. Each flange 604 is shown to include surface 606. When driver 124 is inserted in opening 180 of actuator bracket 108, surface 606 can be configured to engage surface 506 of actuator bracket 108, thereby preventing driver 124 from passing through opening 180.

Stem portion 162 can be configured to be inserted through drive device 130 of actuator 102 and into an aperture of pointer 104 such that valve actuator 102 can control the rotation of driver 124 by rotation of pointer 104. Pointer 104 controls the rotation of driver 124 by providing force to walls of stem portion 162 along the principal axis of driver 124, causing driver 124 to experience a rotational force. In one embodiment, stem portion 162 may include a flange 608 configured to engage a recess within an aperture of pointer 104.

Driver 124 is also shown to have aperture 164 which can be configured to receive stem fastener 128. Driver 124 can be configured to allow a distal end of stem fastener 128 to be inserted through aperture 164, stem portion 162, middle portion 602 and drive portion 610. In this regard, the distal end of stem fastener 128 can be received by aperture 168 of drive shaft 112 to secure driver 124 actuator brackets 108, and drive shaft 112 to actuator 102.

Figure 7A:
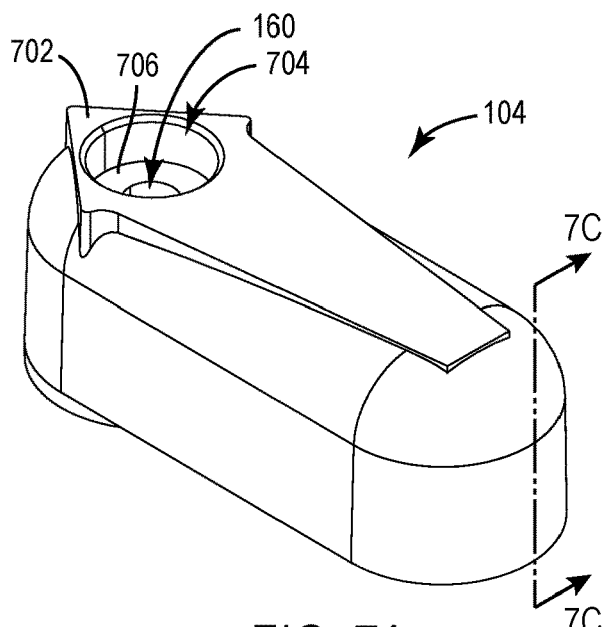
FIGS. 7A-7C are detailed views of a valve actuator pointer, according to some embodiments.
Figure 7B:
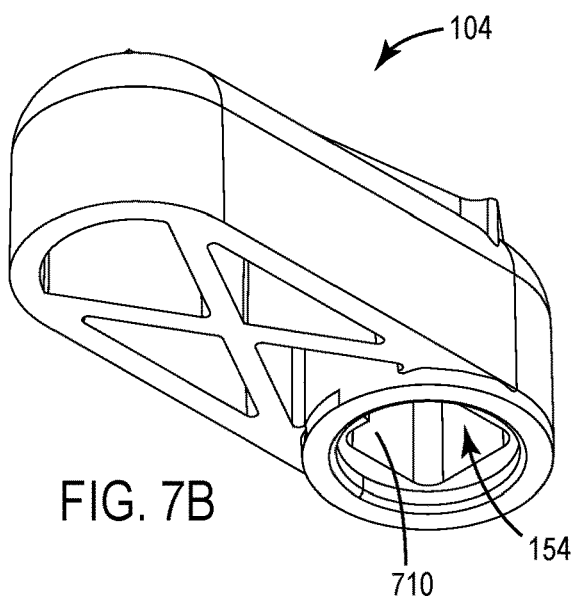
Figure 7C:
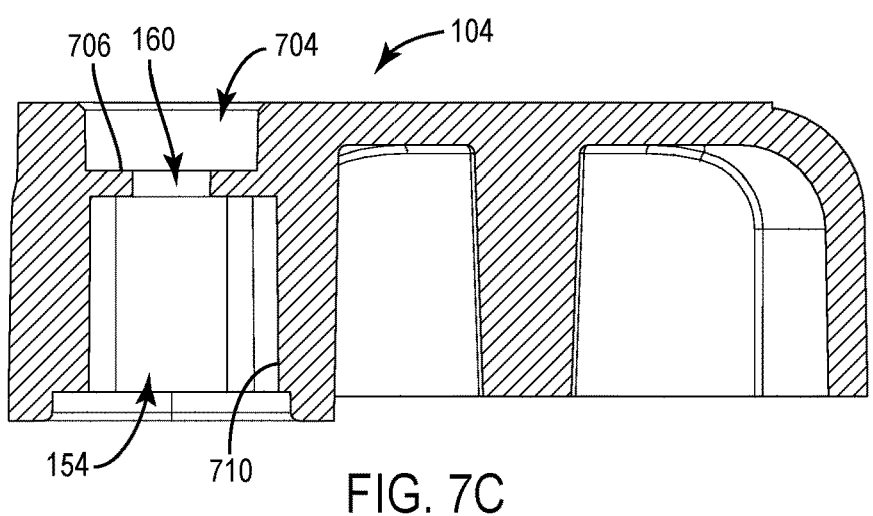

Referring now to FIGS. 7A-7C, valve actuator pointer 104 is shown in greater detail, according to some embodiments. Pointer 104 may include visual indicator 702, such as an arrow or line. Visual indicator 702 can be configured to provide a visual indication of the position of valve control knob 116.

Pointer 104 is shown to include opening 160 and opening 704. The diameter of opening 704 is shown to be greater than the diameter of opening 160, creating surface 706. The diameter of opening 704 can also be greater than the head of stem fastener 128, thereby allowing surface 706 to engage the head of stem fastener 128 when stem fastener 128 is inserted through opening 160. Securing stem fastener 128 to aperture 168 of drive shaft creates a compressive force applied to surface 706, thereby securing pointer 104 to actuator 102.

Pointer 104 is shown to include aperture 154. Aperture 154 has a diameter greater than diameter of stem portion 162 allowing inner surfaces 708 of aperture 154 to engage stem portion 162 of driver 124. For example, aperture 154 may have a rectangular shape corresponding to a rectangular shape of stem portion 162 of driver 124. In this regard, rotation of pointer 104 causes rotation of driver 124 along the same axis, as well as rotation of drive shaft 112, interchangeable connector 114, and valve control knob 116. In some embodiments, aperture 154 may include one or more grooves or recesses along inner surfaces 708 configured to engage flange 608 provided on stem portion 162 of driver 124.

Configuration of Embodiments

References herein to the positions of elements (e.g. "top," "bottom," "above," "below," etc.) are merely used to describe the orientation of various elements in the figures. It should be noted that the orientation of various elements may differ according to other embodiments, and that such variations are intended to be encompassed by the present disclosure.

Accordingly, this description is to be construed as illustrative only. The construction and arrangements, shown in the various embodiments, are illustrative only. Any of the features, elements, steps, or components of any of the embodiments discussed above may be used alone or in combination with any of the features, elements, or components of any of the other embodiments discussed above. Although only a few embodiments have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various embodiments without departing from the scope of the disclosure.

What is claimed is:

1. A universal adapter assembly for coupling a valve actuator to a plurality of different valves having different actuator engagement configurations, the universal adapter assembly comprising:
    a connector having a proximal end and a distal end, wherein the distal end is configured to engage a valve control knob of a valve having a first actuator engagement configuration;
    a drive shaft comprising a proximal end configured to couple to a driver of the valve actuator and a distal end configured to engage the proximal end of the connector and to engage a valve control knob of a valve having a second actuator arrangement different from the first actuator engagement configuration; and
    an adapter bracket configured to be coupled to the valve, the adapter bracket comprising:
        an opening configured to receive the drive shaft, and
        a set of apertures corresponding to at least one of the first or second actuator engagement configuration and configured to secure the adapter bracket to a mounting pad of the valve.

2. The universal adapter assembly of claim 1, wherein the proximal end of the drive shaft is received within an aperture of the driver of the valve actuator.

3. The universal adapter assembly of claim 1, further comprising an actuator adapter configured to couple the adapter bracket to the valve actuator, wherein the actuator adapter comprises a set of mounting posts extending from a surface of the actuator adapter, the set of mounting posts configured to engage apertures of the adapter bracket.

4. The universal adapter assembly of claim 1, wherein the adapter bracket further comprises a second set of apertures configured to secure the adapter bracket to a mounting pad of a second valve of the plurality of different valves.

5. The universal adapter assembly of claim 1, wherein the drive shaft comprises a threaded aperture configured to receive a threaded stem fastener that extends through the valve actuator.

6. The universal adapter assembly of claim 1, wherein the connector comprises a distal end having an aperture configured to engage one or more walls of the valve control knob.

7. The universal adapter assembly of claim 1, wherein the connector comprises a distal end having a flange configured to be received by an aperture of the valve control knob.

8. A universal adapter assembly for coupling a valve actuator to a plurality of different valves having different actuator engagement configurations, the universal adapter assembly comprising:
    a connector having a proximal end and a distal end, wherein the distal end is configured to engage a first valve control knob of a first valve having a first actuator engagement configuration;
    a drive shaft having a proximal end and a distal end, wherein the distal end is configured to engage the proximal end of the connector to couple to the valve actuator to the first valve, and engage a second valve control knob of a second valve having a second actuator engagement configuration different from the first actuator engagement configuration to couple to the valve actuator to the second valve, and wherein the proximal end is configured to engage a driver of the valve actuator, the driver further configured to engage a third valve control knob of a third valve having a third actuator engagement configuration; and
    an adapter bracket configured to be coupled to the first valve, the adapter bracket comprising:
        an opening configured to receive the drive shaft, and
        a set of apertures corresponding to the actuator engagement configuration and configured to secure the adapter bracket to a mounting pad of the first valve.

9. The universal adapter assembly of claim 8, wherein the proximal end of the drive shaft is received within an aperture of the driver of the valve actuator.

10. The universal adapter assembly of claim 8, further comprising an actuator adapter configured to couple the adapter bracket to the valve actuator, wherein the actuator adapter comprises a set of mounting posts extending from a surface of the actuator adapter, the set of mounting posts configured to engage apertures of the adapter bracket.

11. The universal adapter assembly of claim 8, wherein the adapter bracket further comprises a second set of apertures configured to secure the adapter bracket to a mounting pad of the second valve.

12. The universal adapter assembly of claim 8, wherein the drive shaft comprises a threaded aperture configured to receive a threaded stem fastener that extends through the valve actuator.

13. The universal adapter assembly of claim 8, wherein the distal end of the connector comprises an aperture configured to engage one or more walls of the first valve control knob.

14. The universal adapter assembly of claim 8, wherein the distal end of the connector comprises a flange configured to be received by an aperture of the first valve control knob.

15. A universal adapter assembly for coupling a valve actuator to a plurality of different valves having different actuator engagement configurations, the universal adapter assembly comprising:

an interchangeable connector having a proximal end and a distal end, wherein the distal end is configured to engage a valve control knob of a valve having a first actuator engagement configuration;

a drive shaft configured to engage the proximal end of the interchangeable connector; and an adapter bracket configured to be coupled to the valve, the adapter bracket comprising:

an opening configured to receive the drive shaft, a first set of apertures for securing the adapter bracket to a mounting pad of the valve having the first actuator engagement configuration, and a second set of apertures for securing the adapter bracket to a mounting pad of a valve having a second actuator engagement configuration different from the first actuator engagement configuration.

16. The universal adapter assembly of claim 15, wherein the drive shaft is coupled to a driver of the valve actuator.

17. The universal adapter assembly of claim 15, further comprising an actuator adapter configured to couple the adapter bracket to the valve actuator.

18. The universal adapter assembly of claim 17, wherein the actuator adapter comprises a set of mounting posts extending from a surface of the actuator adapter, the set of mounting posts configured to engage apertures of the adapter bracket.

19. The universal adapter assembly of claim 15, wherein the drive shaft comprises a threaded aperture configured to receive a threaded stem fastener that extends through the valve actuator.

20. The universal adapter assembly of claim 15, wherein the universal adapter assembly further comprises a second interchangeable connector having a distal end configured to engage a valve control knob of the valve having the second actuator engagement configuration.

* * * * *